(12) United States Patent
Okada et al.

(10) Patent No.: US 9,868,227 B2
(45) Date of Patent: Jan. 16, 2018

(54) THRUST LOAD MEASURING DEVICE FOR SEALED MIXING DEVICE AND CALIBRATION METHOD FOR SAME

(71) Applicant: Kobe Steel, Ltd., Hyogo (JP)

(72) Inventors: Toru Okada, Kobe (JP); Yusuke Tanaka, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 15/035,978

(22) PCT Filed: Dec. 9, 2014

(86) PCT No.: PCT/JP2014/082583
§ 371 (c)(1),
(2) Date: May 11, 2016

(87) PCT Pub. No.: WO2015/093350
PCT Pub. Date: Jun. 25, 2015

(65) Prior Publication Data
US 2016/0297101 A1 Oct. 13, 2016

(30) Foreign Application Priority Data

Dec. 20, 2013 (JP) ................................ 2013-263890

(51) Int. Cl.
*B29B 7/28* (2006.01)
*B29C 47/08* (2006.01)
(Continued)

(52) U.S. Cl.
CPC ........ *B29B 7/283* (2013.01); *B01F 15/00201* (2013.01); *B29B 7/18* (2013.01);
(Continued)

(58) Field of Classification Search
CPC ....... B29B 7/7495; B29B 7/283; B29B 7/246; B29B 7/401; B29B 7/22; B29B 7/183;
(Continued)

(56) References Cited

U.S. PATENT DOCUMENTS

| 4,768,389 A | * | 9/1988 | Chszaniecki | ....... B30B 15/0094 |
| | | | | 73/862.49 |
| 9,643,338 B2 | * | 5/2017 | Edwards | ................. B29B 7/183 |

(Continued)

FOREIGN PATENT DOCUMENTS

| CN | 101354299 A | 1/2009 |
| GB | 914669 A | 1/1963 |

(Continued)

OTHER PUBLICATIONS

International Search Report issued in PCT/JP2014/082583; dated Mar. 3, 2015.
(Continued)

*Primary Examiner* — Charles Cooley
(74) *Attorney, Agent, or Firm* — Studebaker & Brackett PC

(57) ABSTRACT

The relative displacement in the axial direction between an outer ring fixing member or casing and an inner ring fixing member or rotor is determined, said outer ring fixing member being a member for affixing an outer ring of a bearing on one side, and said inner ring fixing member being a member for affixing an inner ring of the bearing on the one end side. When calculating a thrust load acting on the rotor by multiplying the determined relative displacement by a conversion coefficient, an axial force measuring bolt is used as a tightening bolt for affixing the bearing on the one end side, said axial force measuring bolt enabling measurement of a load acting in the axial direction. The axial force measured by the axial force measuring bolt and the relative displace- (Continued)

ment during measurement of the axial force are used to calibrate the conversion coefficient.

7 Claims, 6 Drawing Sheets

(51) Int. Cl.
*B01F 15/00* (2006.01)
*B29B 7/18* (2006.01)
*G01L 5/12* (2006.01)
*G01L 25/00* (2006.01)
*B29B 7/24* (2006.01)
*B29B 7/26* (2006.01)

(52) U.S. Cl.
CPC .......... *B29B 7/183* (2013.01); *B29C 47/0801* (2013.01); *B29C 47/0803* (2013.01); *G01L 5/12* (2013.01); *G01L 25/00* (2013.01); *B29B 7/246* (2013.01); *B29B 7/263* (2013.01)

(58) Field of Classification Search
CPC ......... B29B 7/263; B29B 7/18; B01F 15/026; B01F 7/04; B01F 15/00201; G01L 5/12; G01L 25/00; B29C 47/0801; B29C 47/0803
USPC ............................................... 366/76.7, 76.8
See application file for complete search history.

(56) References Cited

U.S. PATENT DOCUMENTS

| | | | | |
|---|---|---|---|---|
| 9,751,238 | B2* | 9/2017 | Okada | B29B 7/283 |
| 2015/0082896 | A1* | 3/2015 | Wu | G01L 5/24 73/761 |
| 2016/0297101 | A1* | 10/2016 | Okada | G01L 5/12 |
| 2016/0297102 | A1* | 10/2016 | Okada | B29B 7/18 |
| 2017/0225132 | A1* | 8/2017 | Ozawa | B01F 3/1214 |
| 2017/0225359 | A1* | 8/2017 | Manabe | B29B 7/28 |

FOREIGN PATENT DOCUMENTS

| | | |
|---|---|---|
| JP | H07-237218 A | 9/1995 |
| JP | 10-044145 A | 2/1998 |
| JP | 2001-277236 A | 10/2001 |

OTHER PUBLICATIONS

Written Opinion issued in PCT/JP2014/082583; dated Mar. 3, 2015.
The extended European search report issued by the European Patent Office dated Jun. 20, 2017, which corresponds to European Patent Application No. 14872379.4-1706 and is related to U.S. Appl. No. 15/035,978.

* cited by examiner

THRUST LOAD MEASURING DEVICE FOR SEALED MIXING DEVICE AND CALIBRATION METHOD FOR SAME

TECHNICAL FIELD

The present invention relates to a thrust load measuring device for measuring a thrust load generated on a rotor when a material to be kneaded is kneaded by a hermetically sealed kneader, and a calibration method for the same.

BACKGROUND ART

Hitherto, there have been hermetically sealed kneaders that knead a material to be kneaded, such as rubber and plastic, such as a hermetically sealed kneader disclosed in Patent Document 1. The hermetically sealed kneader according to Patent Document 1 is configured in such a manner as to knead a material to be kneaded that is pressed into a kneading chamber by two rotors provided in the kneading chamber, and take out the material to be kneaded in a desired kneaded state to the exterior. In these two rotors, a shaft is rotatably supported by bearings on both sides. An end portion of each rotor on a drive side is an input shaft that protrudes to the exterior. Output shafts of an adjacently disposed driving device and these input shafts are connected to each other through connectors, such as a gear coupling.

In the hermetically sealed kneader according to Patent Document 1, a material to be kneaded, such as rubber and plastic, is input at a predetermined rate together with various additives into a hopper from an input port above. This material to be kneaded is pressed into the kneading chamber in a sealed state by a pushing action of a floating weight. The material to be kneaded thus pressed into the kneading chamber is kneaded by the rotors that rotate in directions different from each other. In other words, a driving force (rotation) of a motor is transmitted through a speed reducer to each of the rotors, and the rotors each rotate in such a manner as to sweep an inner wall of the kneading chamber, while rotating in directions different from each other. Thereby, a resin material (material to be kneaded) pressed into the kneading chamber is kneaded together with various additives, and the material to be kneaded in a desired kneaded state is taken out to the exterior.

Moreover, a blade (kneading blade) is provided on an outer circumferential surface of each rotor, and in the hermetically sealed kneader according to Patent Document 1, these blades have a structure spirally twisted relative to an axial line of the rotor. An action of these twisted blades cause the material to be kneaded, such as rubber and plastic, to be pushed in an axial direction, and cause a material flow that delivers the material to be kneaded along the axial direction to be generated. In addition, the blades are twisted such that flows in directions opposite to each other with respect to the two rotors are generated, and the material to be kneaded is allowed to flow in such a manner as to circulate in the chamber, thereby achieving an effective kneading.

Note that, in the hermetically sealed kneader disclosed in Patent Document 1, in other words, in common hermetically sealed kneaders, the material to be kneaded is delivered along the axial direction by the spirally twisted blades formed on the rotors, a counteraction of which causes a reaction force (thrust load) directed in the axial direction to be generated. Since such a thrust load exerts a large influence on the lifetime of the bearings that support the rotors, accurately measuring a thrust load is required for determining the lifetime of the bearings. Moreover, in a case in which a thrust load fails to be accurately grasped, there may arise problems, such as application of a thrust load greater than or equal to that designed to the bearings, or, on the contrary, use of the bearings having excessive capability. Thus, in a case in which the bearings of a type as described above are employed, providing an element that can accurately measure a load applied to the rotors in a thrust direction is preferable.

For example, Patent Document 2 discloses a method of measuring a load applied to a bearing while a load sensor is provided between a bearing body and a casing.

CITATION LIST

Patent Document

Patent Document 1: JP H10-44145 A
Patent Document 2: JP 2001-277236 A

SUMMARY OF THE INVENTION

Technical Problem

The method according to Patent Document 2 as described above is to measure a radial load (more precisely a load in a case in which rolls are separated from each other in a radial direction), but appears to be able to be adequately applied when a thrust load is measured. However, a measuring device used in this method has a complicated structure and requires a relatively large space for installation, and installation may be difficult due to a limited installation space. Moreover, in a case in which additional installation to an already installed kneading equipment is performed, a casing of a kneader may have to be largely reorganized, and installation to the already installed equipment is difficult.

To cope with this problem, a thrust load measuring method in which a relative displacement between an inner race and an outer race of a bearing is measured by a displacement sensor or the like and the determined relative displacement is multiplied by a conversion factor, thereby calculating a thrust load applied to a rotor can be proposed. This measuring method is a highly useful method, while failing to calculate an accurate thrust load if the conversion factor fails to constantly hold a correct value. Thus, appropriately calibrating the conversion factor to be maintained at a proper value is required.

Such calibration of the conversion factor, in other words, calibration of the measuring device can be performed by applying an already grasped thrust load to the rotor and measuring a then occurring relative displacement. However, a value of the conversion factor varies depending on a friction state in the interior of the bearing and whether or not the rotor is rotating, so that an advance test, such as performing measurement of the relative displacement to be used for calibration while the rotor is made to rotate and a thrust load similar to that during manufacture is applied to the rotor, is required. In such an advance test, providing a mechanism that applies a large thrust load to the rotor and a mechanism that rotates the rotor is a difficult matter, and the measuring device itself requires to be large and complicated.

The present invention has been achieved in view of the problem as described above, and an object of the present invention is to provide a thrust load measuring device for a hermetically sealed kneader that is capable of simply and accurately determining a conversion factor for converting a relative displacement into a thrust load, and a calibration method for the same.

Solution to Problem

To solve the problem as described above, a calibration method for a thrust load measuring device for a hermetically sealed kneader according to the present invention provides the following technical measures. In other words, the calibration method for the thrust load measuring device for the hermetically sealed kneader according to the present invention, the hermetically sealed kneader including a pair of rotors that are disposed to be adjacent to each other with a predetermined space therebetween in such a manner that axes are parallel to each other and rotate in directions different from each other, in which a bearing that supports a load applied to each rotor in a radial direction is provided at both end sides of the pair of rotors, and a load applied to each rotor in a thrust direction is supported by the bearing on one end side among from the bearings at both the end sides, the method includes: determining a relative displacement along an axial direction between an outer race fixing component that fixes an outer race of the bearing on the one end side or a casing to which the outer race fixing component is fitted and an inner race fixing component that fixes an inner race of the bearing on the one end side or the rotor to which the inner race fixing component is fitted; using axial force measuring bolts that can measure a load applied in the axial direction as fastening bolts for fixing the bearing on the one end side when a thrust load applied to the rotor is calculated by multiplying the determined relative displacement by a conversion factor; and calibrating the conversion factor using axial forces measured by the axial force measuring bolts and the relative displacement when the axial forces are measured.

Note that, preferably, the axial force measuring bolts are used in place of the fastening bolts for the outer race fixing component that fix the outer race fixing component to the casing. Note that, preferably, the axial force measuring bolts are used in place of the fastening bolts for the inner race fixing component that fix the inner race fixing component to the rotor. Note that, preferably, a load less than or equal to a value in which a maximum thrust load among from thrust loads generated on the rotor during kneading is divided by a number of the fastening bolts provided to the rotor is set to be an initial axial force of the axial force measuring bolts, and the conversion factor is calibrated using axial forces measured by the axial force measuring bolts when an axial force above the initial axial force is applied to all the axial force measuring bolts.

Note that, preferably, a load less than or equal to a value in which a maximum thrust load among from thrust loads generated on the rotor during kneading is divided by a number of the fastening bolts provided to the casing is set to be an initial axial force of the axial force measuring bolts, and the conversion factor is calibrated using axial forces measured by the axial force measuring bolts when an axial force above the initial axial force is applied to all the axial force measuring bolts.

Moreover, to solve the problem as described above, a thrust load measuring device for a hermetically sealed kneader according to the present invention provides the following technical measures. In other words, the thrust load measuring device for the hermetically sealed kneader according to the present invention, the hermetically sealed kneader including a pair of rotors that are disposed to be adjacent to each other with a predetermined space therebetween in such a manner that axes are parallel to each other and rotate in directions different from each other, in which a bearing that supports a load applied to each rotor in a radial direction is provided at both end sides of the pair of rotors, and a load applied to each rotor in a thrust direction is supported by the bearing on one end side among from the bearings at both the end sides, the thrust load measuring device includes: a displacement sensor that determines a relative displacement along an axial direction between an outer race fixing component that fixes an outer race of the bearing on the one end side or a casing to which the outer race fixing component is fitted and an inner race fixing component that fixes an inner race of the bearing on the one end side or the rotor to which the inner race fixing component is fitted; axial force measuring bolts that can measure a load applied in the axial direction as fastening bolts for fixing the bearing on the one end side when a thrust load applied to the rotor is calculated by multiplying the determined relative displacement by a conversion factor; and a load calculating section that calibrates the conversion factor using axial forces measured by the axial force measuring bolts and the relative displacement when the axial forces are measured.

Advantageous Effects of the Invention

According to the thrust load measuring device for the hermetically sealed kneader according to the present invention, and the calibration method for the same, a conversion factor for converting a relative displacement into a thrust load can be simply and accurately determined, and calibration of the thrust load measuring device can be properly performed.

DESCRIPTION OF EMBODIMENTS

Figure 1:
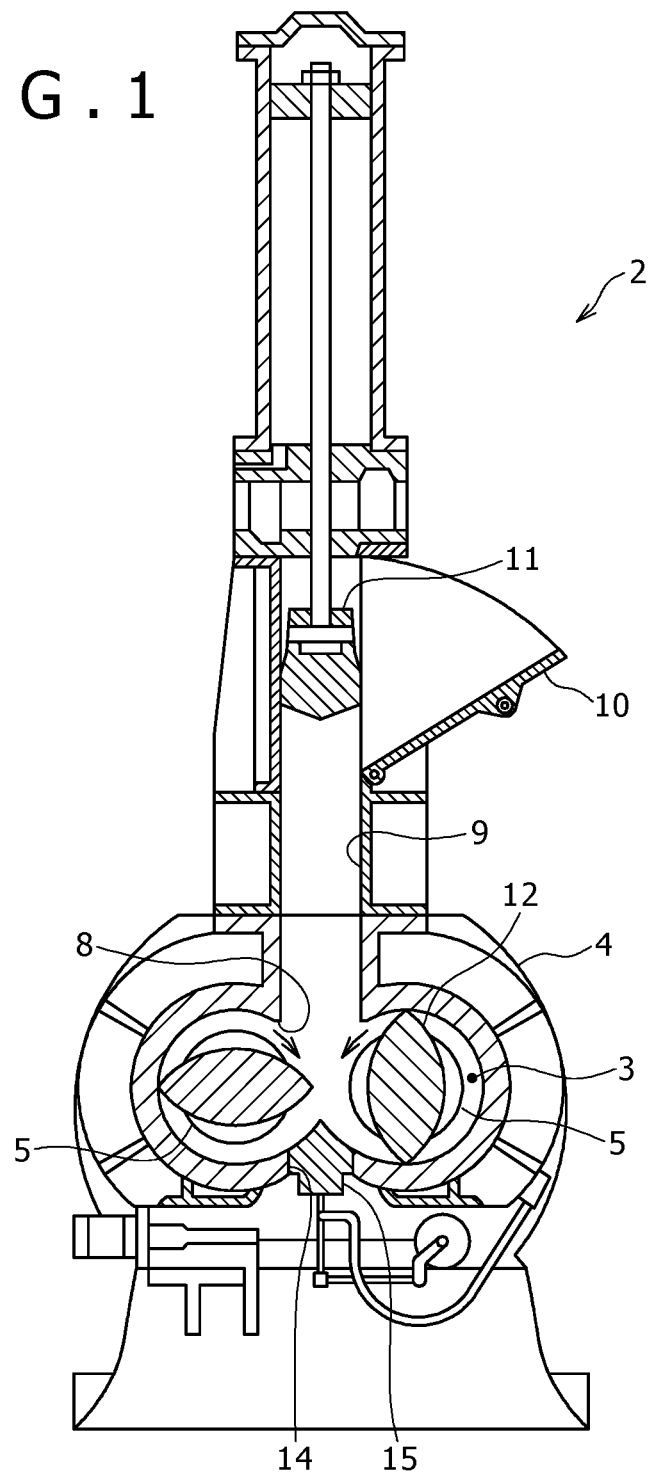
FIG. 1 is a diagram illustrating a structure of a hermetically sealed kneader provided with a thrust load measuring device in which calibration by a calibration method according to an embodiment is performed.

Hereinafter, a thrust load measuring device 1 and a calibration method for the same according to embodiments of the present invention will be described. First, before describing the calibration method for the thrust load measuring device 1, a hermetically sealed kneader 2 to which the thrust load measuring device 1 is provided will be described. In FIG. 1, the hermetically sealed kneader 2 according to this embodiment is schematically illustrated. As illustrated in FIG. 1, the hermetically sealed kneader 2 according to this embodiment includes a housing 4 including the interior as a kneading chamber 3, and a pair of rotors 5, 5 provided in the interior of the housing 4. Then, the hermetically sealed kneader 2 is configured such that a material to be kneaded, such as rubber and plastic, pressed into the kneading chamber 3 is kneaded by the pair of rotors 5, and the material to be kneaded in a desired kneaded state is taken out to the exterior.

Figure 2:
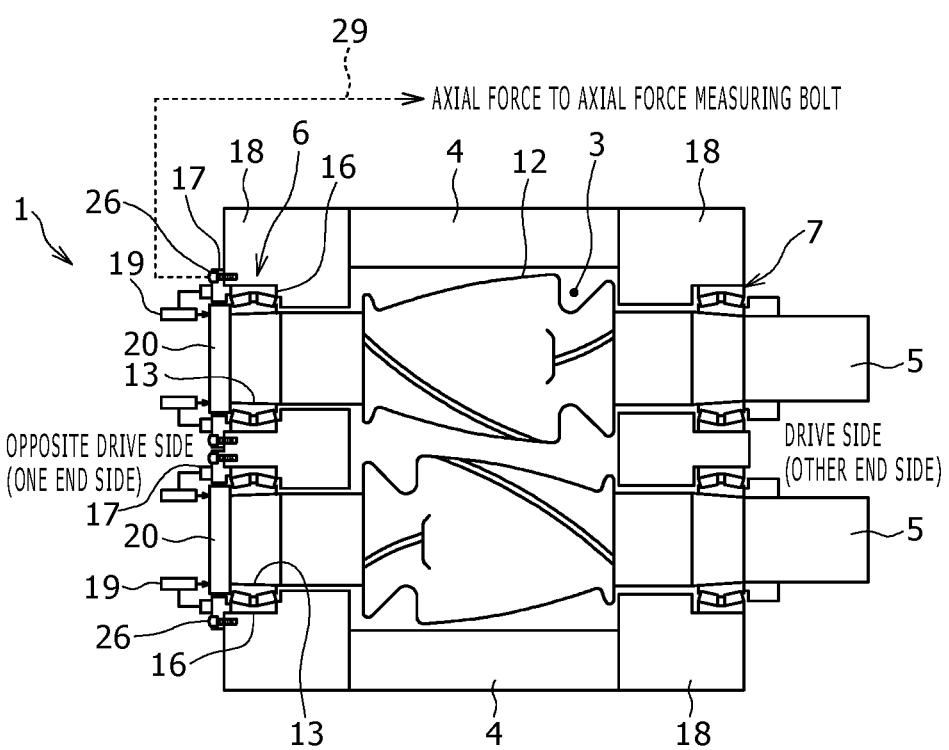
FIG. 2 is a diagram illustrating a kneading section and the thrust load measuring device of the hermetically sealed kneader.

As illustrated in FIG. 2, the pair of rotors 5, 5 are rotatably supported at both end sides in an axial direction by bearings 6, 7. Moreover, one end side of each rotor 5 in the axial direction (side opposite a drive side) does not protrude to the exterior of the housing 4, while the other end side in the axial direction (drive side) protrudes to the exterior of the casing 4. To the protruding other end side of each rotor 5, a connector, such as a gear coupling, is connected and a driving force generated by a driving device is input via the connector.

Note that, in the description hereinafter, the left side of the drawing paper of FIG. 2 is referred to as "opposite drive side" or "one end side" to describe the thrust load measuring device 1, and the right side of the drawing paper is referred to as "drive side" or "other end side" to describe the thrust load measuring device 1. Moreover, the upper side of the drawing paper of FIG. 1 is referred to as "upper side" to describe the thrust load measuring device 1, and the lower side of the drawing paper is referred to as "lower side" to describe the thrust load measuring device 1. Further, the upper side of the drawing paper of FIG. 2 is referred to as "left side" to describe the thrust load measuring device 1, and the lower side of the drawing paper is referred to as "right side" to describe the thrust load measuring device 1.

As illustrated in FIG. 1, at an upper portion of the kneading chamber 3, an opening portion 8 that opens upward is formed. At an upper side of the opening portion 8, a material feeding passage 9 that guides (feeds) the material to be kneaded, such as rubber and plastic, along a vertical direction is formed. Moreover, at an upper portion of the material feeding passage 9, a hopper 10 that can be opened by being swung downward. From the hopper 10, the material to be kneaded in which a base material, such as rubber and plastic, is blended with an additive or the like is input. Moreover, in the interior of the material feeding passage 9, a floating weight 11 is movably provided along a direction in which the material feeding passage 9 is formed (vertical direction). Moving the floating weight 11 downward allows the material to be kneaded input into the interior of the material feeding passage 9 to be pushed into the kneading chamber 3 below.

The kneading chamber 3 is formed into such a shape that two cylindrical cavities are horizontally aligned such that outer circumferential surfaces partially overlap each other (eyeglass hole cross-sectional shape along an axis perpendicular direction). In the interior of the kneading chamber 3, the pair of rotors 5, 5 as described above are disposed. The pair of rotors 5, 5 have axes substantially corresponding to the centers of the two cylindrical cavities of the kneading chamber 3. As illustrated in FIG. 2, on the outer circumferential surface of each rotor 5, a blade 12 that kneads the material to be kneaded is formed. In each rotor 5, the blade 12 provided on the outer circumferential surface of this rotor 5 has a structure twisted relative to the axial direction (axial line), and the right rotor 5 and the left rotor 5 are formed in such a manner as to generate flows of the material to be kneaded in directions axially opposite to each other.

At both the end sides of each rotor 5, the bearings 6, 7 that rotatably support this rotor 5 are correspondingly disposed. As the bearings 6, 7 at both the end sides, a bearing that can support not only a load in a radial direction but also a load in a thrust direction is employed. For such bearings 6, 7, a double row tapered roller bearing or a self-aligning roller bearing is employed. Note that the bearing 7 on the other end side of the rotor 5 has such a structure as to be capable of sliding in the thrust direction to absorb thermal expansion of the rotor 5.

Moreover, on the other end side of the rotor 5 in the axial direction, a speed reducer that reduces a rotational driving force (rotation) generated by the driving device, such as a motor, and transmits the same is provided. The rotational driving force reduced by this speed reducer is input to the corresponding rotor 5 through the connector as described above (gear coupling that allows a deviation between an axis of the speed reducer and the axis of the corresponding rotor 5 and allows the corresponding rotor 5 to move in the axial direction), so that the rotors 5, 5 each rotate in directions different from each other. Further, the rotor 5 at the one end side in the axial direction is formed into a shape tapered toward a tip end, and an inner race 13 of the bearing 6 is fitted to this tapered portion.

Specifically, in the hermetically sealed kneader 2 as described above, the rotor 5 rotates such that the blade 12 sweeps an inner wall of the kneading chamber 3, and the material to be kneaded pressed into the kneading chamber 3 is kneaded together with various additives by the blade 12 formed on the rotor 5. Then, the rotors 5, 5, include the blades 12 twisted in the same direction, while rotating in directions opposite to each other, whereby, on the left rotor 5 illustrated on the upper side of the drawing paper of FIG. 2, a thrust load from the other end side (drive side) toward the one end side (opposite drive side) in the axial direction is generated, while, on the right rotor 5 illustrated on the lower side of the drawing paper of FIG. 2, a thrust load from the one end side (opposite drive side) toward the other end side (drive side) in the axial direction is generated. Then, the thrust loads generated on the rotor 5 illustrated on the upper side of the drawing paper of FIG. 2 and on the rotor 5 illustrated on the lower side of the drawing paper are each supported by the bearing 6 on the one end side.

The material to be kneaded that has been thus kneaded by rotation of each rotor 5 is taken out from a discharge port 14 to the exterior of the kneading chamber 3 by opening a drop door 15 of the discharge port 14 formed below the kneading chamber 3. Then, after taking out the material to be kneaded, the drop door 15 is swung upward again to close the discharge port 14 of the kneading chamber 3, and a material to be kneaded of a next batch is pushed into the kneading chamber 3 using the floating weight 11 from the input port. Such a batch type kneading cycle is repeated, whereby kneading is performed in the hermetically sealed kneader 2 as described above.

Note that, since a thrust load generated on the rotor 5 due to kneading of a material to be kneaded exerts a large influence on the lifetime of the bearings (thrust bearings)

that support the rotor 5, accurately measuring a thrust load is required for determining the lifetime of the bearings. Thus, in the hermetically sealed kneader 2, the bearing 6 on the one side to which a thrust load is applied is provided with the thrust load measuring device 1. The thrust load measuring device 1 measures a displacement of the inner race 13 relative to an outer race 16 of the bearing 6 along the axial direction as a relative displacement, and multiplies the measured relative displacement by a conversion factor, thereby accurately calculating a thrust load.

Next, the thrust load measuring device 1 according to embodiments of the present invention will be described. In the bearing 6 on the one end side as described above, the outer race 16 is fitted through an outer race fixing component 17 (bearing fixer) to a casing 18 disposed on a further outer circumferential side of the outer race 16. Meanwhile, the inner race 13 of the bearing 6 is fitted through an inner race fixing component 20 (bearing fixer) to the rotor 5 disposed on a further inner circumferential side of the inner race 13. These outer race fixing component 17 and inner race fixing component 20 are disposed adjacent to the outer race 16 and the inner race 13 on the one end side, respectively. The outer race fixing component 17 is fastened (fixed) to the casing 18 using fastening bolts as described below. The inner race fixing component 20 is fastened (fixed) to an end surface of the rotor 5 on the one end side using fastening bolts as described below.

Specifically, the thrust load measuring device 1 includes at least one displacement sensor 19 in a component disposed on a side of the outer race 16 of the bearing 6 on the one end side, in other words, in the outer race fixing component 17 or the casing 18 to which the outer race fixing component 17 is fitted. Then, the displacement sensor 19 can measure a relative displacement of the inner race 13 relative to the outer race 16 along the axial direction. In other words, the displacement sensor 19 can measure a position of the inner race fixing component 20 that fixes the inner race 13 of the bearing 6 on the one end side or a position of the rotor 5 to which the inner race fixing component 20 is fitted. Moreover, the thrust load measuring device 1 is provided with a load calculating section (unillustrated) that calculates a thrust load on the rotor 5 by multiplying the relative displacement measured by the displacement sensor 19 by a conversion factor.

In other words, the thrust load measuring device 1 calculates a thrust load applied to the rotor 5 by measuring, in the displacement sensor 19, a relative displacement indicating how much the inner race fixing component 20 or the rotor 5 is displaced along the axial direction relative to the outer race fixing component 17 or the casing 18, and by multiplying, in the load calculating section, the relative displacement measured by the displacement sensor 19 by a conversion factor. Note that performing calibration in such a manner that a proper thrust load is calculated based on a relative displacement is required so that the thrust load measuring device 1 accurately determines a thrust load generated on the rotor 5. Such calibration of the thrust load measuring device 1 is performed by correcting a conversion factor value into a proper one in such a manner that a thrust load actually measured by the thrust load measuring device 1 corresponds to a true thrust value.

However, calibration of the thrust load measuring device 1 as described above is required to be performed in the hermetically sealed kneader 2 actually provided with the thrust load measuring device 1, in other words, in an actual device. Specifically, since a thrust load to the rotor 5 varies depending on a friction state in the interior of the bearing 6 and whether or not the rotor 5 is rotating, to achieve accurate calibration, calibration is desirably performed while applying such a large thrust load as that actually generated during kneading in the hermetically sealed kneader 2 and allowing the rotor 5 to rotate.

In this regard, the present inventors have conceived of performing calibration through replacing the fastening bolts that fix the bearing 6 with axial force measuring bolts 26 that can measure a load applied in the axial direction, using an axial force measured by the axial force measuring bolt 26, when performing calibration of the thrust load measuring device 1. Using such axial force measuring bolts 26 enables performing calibration in the hermetically sealed kneader 2 actually provided with the thrust load measuring device 1 under the same conditions with those when kneading is actually performed, and enables performing calibration of the thrust load measuring device 1 with high accuracy.

In other words, the calibration method for the thrust load measuring device 1 according to embodiments of the present invention is characterized by using the axial force measuring bolts 26 that can measure a load applied in the axial direction in place of the fastening bolts for fixing the bearing 6 on the one end side as described above, and calibrating a conversion factor using an axial force measured by this axial force measuring bolts 26 and a relative displacement when this axial force is measured. Specifically, the axial force measuring bolts 26 as described above may be used in place of the fastening bolts for the outer race fixing component 17 that fix the outer race fixing component 17 to the casing 18, or in place of the fastening bolts for the inner race fixing component 20 that fix the inner race fixing component 20 to the rotor 5 as described above.

Figure 3:
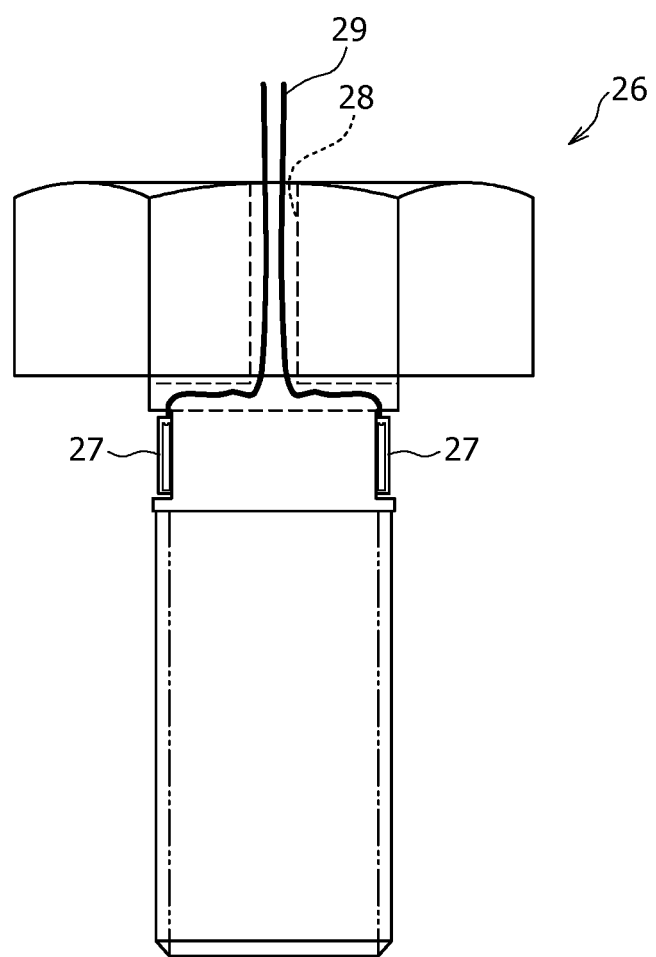
FIG. 3 is a diagram schematically illustrating an axial force measuring bolt used in the calibration method according to the embodiment.

Hereinafter, the calibration method for the thrust load measuring device 1 according to embodiments of the present invention will be described using an example in which the axial force measuring bolts 26 are used in place of the fastening bolts for the outer race fixing component 17. As illustrated in FIG. 3, the axial force measuring bolts 26 are configured to be capable of measuring an axial force applied to a bolt using a strain gauge 27. Specifically, the strain gauge 27 that can detect an axial force is stuck on an outer circumferential surface of each axial force measuring bolt 26. Moreover, in the interior of each axial force measuring bolt 26, a through hole 28 that penetrates the interior of the bolt from a head portion to reach the strain gauge 27 is formed. An output line 29 that extends from the strain gauge 27 is inserted in the through hole 28. The axial force measuring bolts 26 can detect axial forces applied to the axial force measuring bolts 26 by detecting resistance values of the strain gauges 27. Note that, with respect to each axial force measuring bolt 26, in the strain gauge 27 stuck on the axial force measuring bolt 26, a relationship between an axial force and a strain is calibrated in advance.

Such axial force measuring bolts 26 are fitted in place of the fastening bolts for the outer race fixing component 17 that fix the outer race fixing component 17 to the casing 18 as described above. In other words, the outer race fixing component 17 is formed into a circular shape so as to be fastened using the plurality of fastening bolts provided at predetermined intervals in a circumferential direction of the outer race fixing component 17. Meanwhile, all of these fastening bolts are the axial force measuring bolts 26 as described above.

Note that, in a case in which the axial force measuring bolts 26 are fitted in place of the fastening bolts for the inner race fixing component 20, similarly to the fastening bolts for the outer race fixing component 17, the fastening bolts for the inner race fixing component 20 may be all replaced with the axial force measuring bolts 26. Axial forces thus measured by the plurality of axial force measuring bolts 26 are all summed up in terms of the number of the axial force measuring bolts 26, and a total sum of axial forces is used as a "thrust load actually applied to the rotor 5," in other words, a true thrust load value. Meanwhile, the thrust load measuring device 1 as described above also calculates a thrust load based on a relative displacement measured by the displacement sensor 19. Then, a conversion factor is calibrated such that a value calculated by the thrust load measuring device 1 corresponds to a true thrust load value.

Specifically, the calibration method for the thrust load measuring device 1 as described above is performed according to the below procedure. First, the axial force measuring bolts 26 in which a relationship between an axial force and a strain is calibrated in advance are prepared. The fastening bolts that fasten the outer race fixing component 17 to the casing 18 are all replaced with the prepared axial force measuring bolts 26.

In the drawings, the two fastening bolts that are provided with a phase difference of 180° therebetween in the circumferential direction are replaced with the prepared axial force measuring bolts 26. After the fastening bolts are thus fitted in the outer race fixing component 17, a zero point of strain is determined before an axial force is input. Then, while measurement results (output) of axial forces measured by the axial force measuring bolts 26 are observed, the axial force measuring bolts 26 are fastened, such that the measured axial forces correspond to a predetermined initial axial force, so as to be fitted in the outer race fixing component 17.

After the axial force measuring bolts 26 are fitted in the outer race fixing component 17, a material to be kneaded is input into the hermetically sealed kneader 2 while the rotors 5 are allowed to rotate. Output of a relative displacement measured by the displacement sensor 19 and axial forces measured by the axial force measuring bolts 26 are recorded in a data logger or a memory. The axial forces of the axial force measuring bolts 26 thus recorded in a data logger or a memory are summed up in terms of the number of the axial force measuring bolts 26, and a total sum of the axial forces is determined. The determined total sum of the axial forces is divided by a measured value of the relative displacement measured by the displacement sensor 19, whereby a conversion factor is calculated to be a calibrated conversion factor.

Note that this calculation of a conversion factor is required to be performed in a range in which a load to each axial force measuring bolt 26 is above the initial axial force. Accordingly, based on the plurality of conversion factors obtained in a range in which a load to each axial force measuring bolt 26 is above the initial axial force, for example, a representative value of the conversion factors using an average value thereof or the like is determined, and using the determined representative value enables calibration of the thrust load measuring device 1.

Meanwhile, a method of fastening the fastening bolts (fastening force) is required to be proper in order to correctly measure a thrust load applied to the rotor 5 using the axial force measuring bolts 26 as described above. This is because a thrust load can be correctly measured by the axial force measuring bolts 26 only when a thrust load applied to the rotor 5 is applied only to the axial force measuring bolts 26. In other words, in a state in which an end surface of the outer race 16 of the bearing 6 on the other end side is kept in contact with the casing 18 due to, for example, strong fastening of the fastening bolts still when a thrust load is measured, a thrust load applied to the rotor 5 fails to cause the axial force measuring bolts 26 to expand, and a correct thrust load cannot be measured by the axial force measuring bolts 26.

Figure 4:
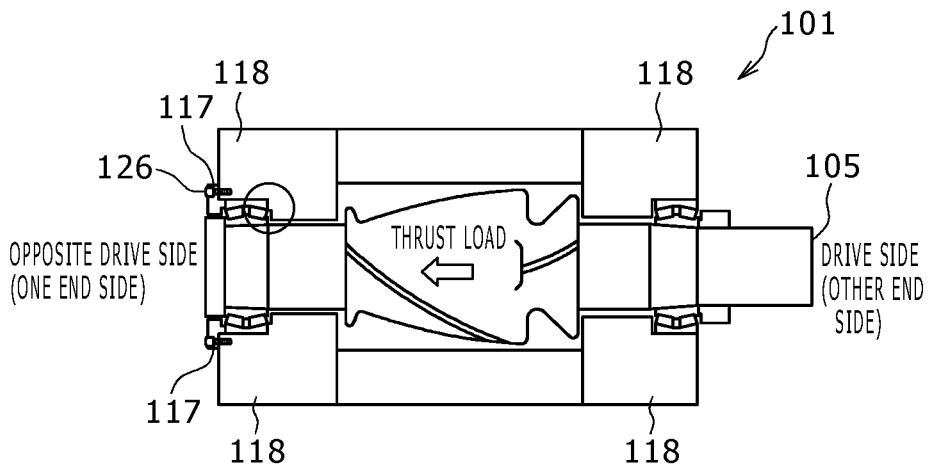
FIG. 4 is a diagram illustrating a state in which an end surface of an outer race of a bearing on other end side and a casing are in contact with each other in the hermetically sealed kneader.

For example, as illustrated in FIG. 4, a case in which axial force measuring bolts 126 (fastening bolts) are strongly fastened relative to a casing 118 is examined. In this case, a fastening force of the axial force measuring bolts 126 is large so that an outer race fixing component 117 is pushed by the axial force measuring bolts 126 to the other end side in the axial direction. Thus, an end surface of a bearing on the other end side is pushed with a strong force through the outer race fixing component 117 by the casing 118 so as to be in contact therewith. Consequently, even if a thrust load is applied and a rotor 105 is pushed toward the one end side, a thrust load transmitted from the rotor 105 through the bearing to the outer race fixing component 117 is transmitted from an end surface of the outer race fixing component 117 on the one end side to the axial force measuring bolts 126, which fails to cause the axial force measuring bolts 126 to expand. In this case, the generated thrust load cannot be measured by the axial force measuring bolts 126. Naturally, axial forces measured by the axial force measuring bolts 126 in such a state cannot be considered to be correct, and performing highly accurate calibration of a thrust load measuring device 101 is difficult.

Figure 5:
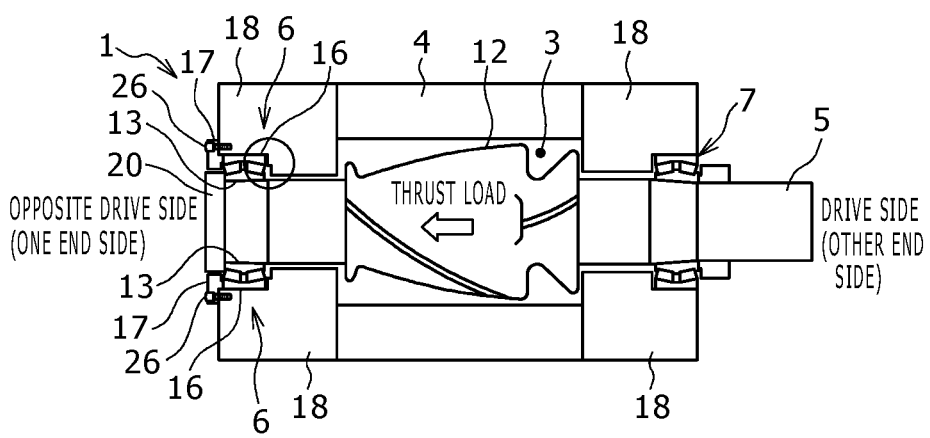
FIG. 5 is a diagram illustrating a state in which an end surface of an outer race of a bearing on other end side and a casing are separated from each other in the hermetically sealed kneader.

On the contrary, as illustrated in FIG. 5, in a case in which the axial force measuring bolts 26 are weakly fastened relative to the casing 18, a strength of fastening the outer race fixing component 17 by the axial force measuring bolts 26 is small so that the outer race fixing component 17 fails to be strongly pushed to the other end side in the axial direction. Accordingly, when a thrust load is applied to the rotor 5, the end surface of the outer race 16 of the bearing 6 on the other end side is separated from the casing 18. Consequently, a thrust load transmitted from the rotor 5 to the outer race fixing component 17 exceeds an initial axial force of the axial force measuring bolts 26 and causes the axial force measuring bolts 26 to expand, so that a thrust load can be measured by the axial force measuring bolts 26.

In other words, if a method of fastening the axial force measuring bolts 26 is adjusted, and fastening can be performed with such a weak fastening force that the end surface of the outer race 16 of the bearing 6 on the other end side is separated from the casing 18 when a thrust load is applied to the rotor 5, the thrust load can be correctly grasped based on axial forces measured by the axial force measuring bolts 26. Note that, since a force that pushes the end surface of the outer race 16 of the bearing 6 on the other end side through the outer race fixing component 17 to the casing 18 so as to be in contact therewith is considered to correspond to a force in which a thrust load applied to the rotor 5 is subtracted from an initial fastening force of the axial force measuring bolts 26, a thrust load can be correctly measured by the axial force measuring bolts 26 if the initial fastening force of the axial force measuring bolts 26 is configured to be less than or equal to a predetermined value. Specifically, preferably, a load less than or equal to a value in which a maximum thrust load among from thrust loads generated on the rotor 5 during kneading is divided by the number of the axial force measuring bolts 26 provided to the casing 18 is set to be an initial axial force, and, a conversion factor is calibrated using axial forces measured by the axial force measuring bolts 26 when an axial force above the initial axial force is applied to all the axial force measuring bolts 26.

Figure 6:
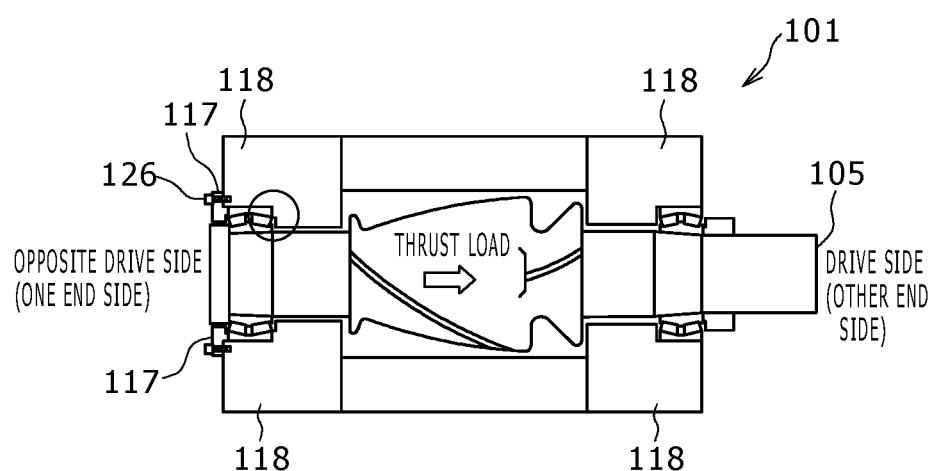
FIG. 6 is a diagram illustrating that the axial force measuring bolt is used as a fastening bolt for an outer race fixing component when a thrust load is applied toward the other end side.
Figure 7:
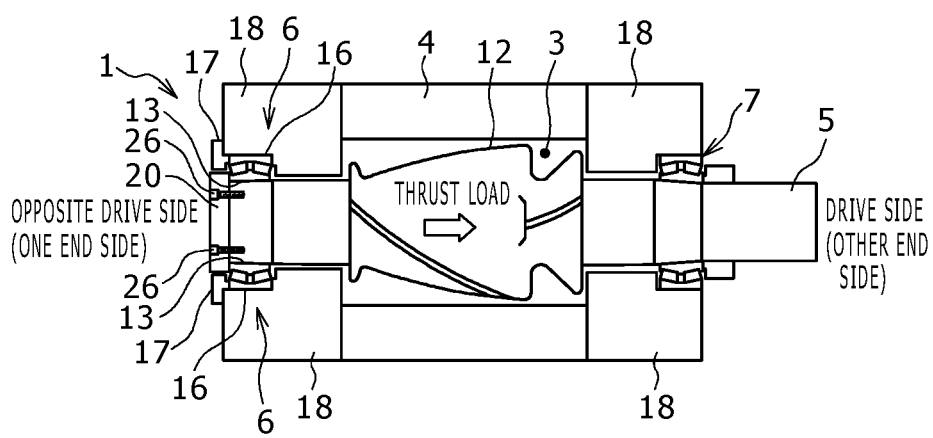
FIG. 7 is a diagram illustrating that the axial force measuring bolt is used as a fastening bolt for an inner race fixing component when a thrust load is applied toward the other end side.

Note that, even in a case similar to FIG. 5 in which an axial force above an initial axial force is applied to all the axial force measuring bolts 26, for example, as illustrated in FIG. 6, when a thrust load is applied to the rotor 105 from the one end side toward the other end side, in other words, when a direction in which a thrust load is applied is reverse, a thrust load cannot be correctly measured by the axial force measuring bolts 26. As in FIG. 6, when a thrust load is applied from the one end side toward the other end side, an end surface of the outer race fixing component 117 on the other end side inevitably comes into contact with the casing 118, which prevents each thrust load from being applied to the axial force measuring bolts 126. Thus, when a thrust load is applied from the one end side toward the other end side, the fastening bolts for the inner race fixing component 20 that are provided between the inner race fixing component 20 and the rotor 5 are all replaced with the axial force measuring bolts 26, as illustrated in FIG. 7, whereby calibration of the thrust load measuring device 1 can be accurately performed.

Also in this case, preferably, a load less than or equal to a value in which a maximum thrust load among from thrust loads generated on the rotor 5 during kneading is divided by the number of the axial force measuring bolts 26 provided to the rotor 5 is set to be an initial axial force, and, a conversion factor is calibrated using axial forces measured by the axial force measuring bolts 26 when an axial force above the initial axial force is applied to all the axial force measuring bolts 26. In light of the above matters, to accurately perform calibration of the thrust load measuring device 1 as described above, in addition to a matter in which an axial force above an initial axial force is applied to all the axial force measuring bolts 26, a matter in which the axial force measuring bolts 26 are fitted to the outer race fixing component 17 or the inner race fixing component 20 in accordance with the direction of a thrust load is required as a condition.

In the calibration method for the thrust load measuring device 1 using the axial force measuring bolts 26 as described above, a conversion factor (calibrated conversion factor) is determined based on axial forces actually applied to the bearing 6 so that calibration of the thrust load measuring device 1 can be performed with high accuracy. Moreover, in the calibration method as described above, providing a large device as a mechanism that applies a thrust load to the rotor 5 or a mechanism that rotates the rotor 5 is unnecessary, and calibration of the thrust load measuring device 1 is enabled without complication of a device configuration.

Next, accuracy of calibration when the calibration method as described above is employed will be described with reference to actual test data. For example, with respect to the outer race fixing component 17 of the bearing 6 provided on the one end side of the rotor 5, the four fixing bolts that fix the outer race fixing component 17 to the casing 18 are replaced with the axial force measuring bolts 26, and each axial force measuring bolt 26 measures an axial force. Note that an initial axial force (strain) of the axial force measuring bolts 26 corresponds to a strain value before input of a material to be kneaded, namely in a state in which a load is not applied, and is set to be in a range in which a strain measured by each axial force measuring bolt 26 is 300-400 μm. Thus, measurement results of an axial force measured by each axial force measuring bolt 26 are illustrated in FIG. 8.

Figure 8:
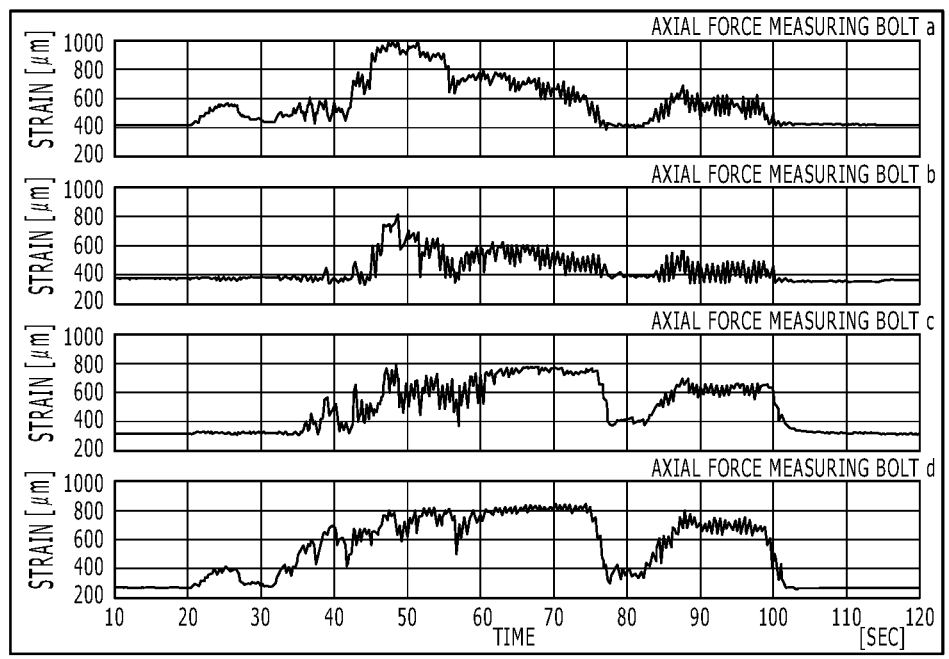
FIG. 8 is a diagram illustrating strains measured by the four axial force measuring bolts.
Figure 9:
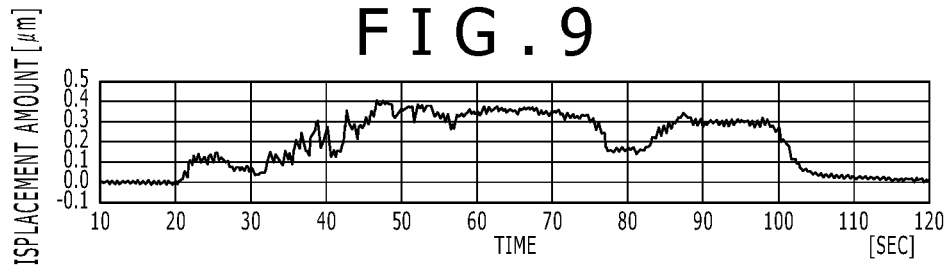
FIG. 9 is a diagram illustrating a relative displacement measured by a displacement sensor.

Note that the longitudinal axis in FIG. 8 indicates not the axial force but the strain, and since a strain multiplied by a conversion factor can be converted into an axial force, results are illustrated in FIG. 8 in which the longitudinal axis indicates the strain. Moreover, also in FIGS. 9 and 10 as well, based on similar reasons, the longitudinal axis indicates the "displacement amount" and the "strain total sum value," and the description will be hereinafter made, assuming that measurement results of axial forces also show the same tendency. Meanwhile, as illustrated in FIG. 9, the outer race fixing component 17 of the thrust load measuring device 1 is provided with the displacement sensor 19, and a relative displacement of the rotor 5 that was measured by the displacement sensor 19 is measured. Thus, in the load calculating section, multiplying the measured relative displacement by a conversion factor allows a thrust load to be calculated.

Figure 10:
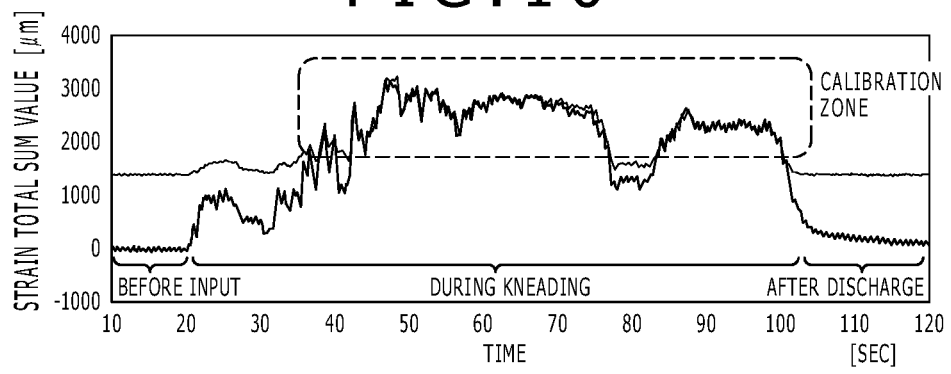
FIG. 10 is a diagram in which a total sum of the strains measured by the axial force measuring bolts and the relative displacement measured by the displacement sensor are compared with each other.

For example, in FIG. 10, the thrust load obtained by multiplying the measured relative displacement by a conversion factor and a total sum of axial forces measured by the axial force measuring bolts 26 are compared with each other. Note that the conversion factor used for calculating the thrust load herein is determined such that a strain of each axial force measuring bolt 26 most closely corresponds to the thrust load calculated from the relative displacement in a zone in which the strain is above the initial axial force.

In view of a result of the "thrust load obtained by multiplying a relative displacement by a conversion factor" indicated by a "thick line" in FIG. 10, kneading starts approximately at 20 seconds after the start of measurement, and a value of the thrust load increases as the time passes. On the other hand, with respect to the "total sum of axial forces" indicated by a "thin line" in FIG. 10, a value does not increase approximately until 35 seconds after the start of measurement, even though slight rise and fall are observed.

However, at 35 seconds after the start of measurement, as a strain of each axial force measuring bolt 26 exceeds the initial axial force, the result of the "thrust load obtained by multiplying a relative displacement by a conversion factor" and a result of the "total sum of axial forces" vary at substantially identical values. Shortly, approximately at 100 seconds after the start of measurement, as a strain of each axial force measuring bolt 26 lowers than the initial axial force, the result of the "thrust load obtained by multiplying a relative displacement by a conversion factor" and the result of the "total sum of axial forces" vary at values largely separated from each other.

These results show that, in a zone in which a strain of each axial force measuring bolt 26 exceeds the initial axial force, the "thrust load obtained by multiplying a relative displacement by a conversion factor" and the "total sum of axial forces measured by the axial force measuring bolts 26" corresponds to each other in an extremely accurate manner. Thus, it is considered that, in a zone in which a strain of each axial force measuring bolt 26 exceeds the initial axial force, a conversion factor for converting a relative displacement into a thrust load can be accurately determined and calibration of the thrust load measuring device 1 can be properly performed.

Note that it should be considered that the embodiments disclosed herein are illustrative and not restrictive in all respects. In particular, in the embodiments disclosed herein, the matters which are not explicitly disclosed, such as the running condition and the operating condition, the various parameters, the dimension, weight, volume of the components and the like, do not depart from the scope ordinarily implemented by those of skill in the art, and the values that can be readily assumed by those of ordinary skill in the art are adopted.

The present application is based on Japanese Patent Application 2013-263890 filed on Dec. 20, 2013, the contents of which are incorporated herein by reference.

EXPLANATION OF REFERENCE NUMERALS 1 thrust load measuring device
2 hermetically sealed kneader
3 kneading chamber
4 housing
5 rotor
6 bearing on one end
7 bearing on other end
8 opening portion
8 material feeding passage
10 hopper
11 floating weight
12 blade
13 inner race
14 discharge port
15 drop door
16 outer race
17 outer race fixing component
18 casing
19 displacement sensor
20 inner race fixing component
26 axial force measuring bolt
27 strain gauge
28 through hole
29 output line

The invention claimed is:

1. A calibration method for a thrust load measuring device of a hermetically sealed kneader, the hermetically sealed kneader including a pair of rotors that are disposed to be adjacent to each other with a predetermined space therebetween in such a manner that axes are parallel to each other and rotate in directions different from each other, in which a bearing that supports a load applied to each rotor in a radial direction is provided at both end sides of the pair of rotors, and a load applied to each rotor in a thrust direction is supported by the bearing on one end side among from the bearings at both the end sides, the method comprising:

determining a relative displacement along an axial direction between an outer race fixing component that fixes an outer race of the bearing on the one end side and an inner race fixing component that fixes an inner race of the bearing on the one end side in order to calculate a thrust load applied to the rotor by multiplying the determined relative displacement by a conversion factor;

using axial force measuring bolts that can measure a load applied in the axial direction as fastening bolts for fixing the bearing on the one end side when a thrust load is applied to the rotor; and calibrating the conversion factor using axial forces measured by the axial force measuring bolts and the relative displacement when the axial forces are measured such that the calibrated conversion factor is obtained by dividing the measured axial force by the relative displacement.

2. The calibration method for the thrust load measuring device of the hermetically sealed kneader according to claim 1, wherein the axial force measuring bolts are used as the fastening bolts for the outer race fixing component that fix the outer race fixing component to the casing.

3. The calibration method for the thrust load measuring device of the hermetically sealed kneader according to claim 2, wherein the axial force measuring bolts are used as the fastening bolts for the inner race fixing component that fix the inner race fixing component to the rotor.

4. The calibration method for the thrust load measuring device of the hermetically sealed kneader according to claim 1, wherein the axial force measuring bolts are used as the fastening bolts for the inner race fixing component that fix the inner race fixing component to the rotor.

5. The calibration method for the thrust load measuring device of the hermetically sealed kneader according to claim 1, wherein a load less than or equal to a value in which a maximum thrust load among from thrust loads generated on the rotor during kneading is divided by a number of the fastening bolts provided to the rotor is set to be an initial axial force of the axial force measuring bolts, and the conversion factor is calibrated using axial forces measured by the axial force measuring bolts when an axial force above the initial axial force is applied to all the axial force measuring bolts.

6. The calibration method for the thrust load measuring device of the hermetically sealed kneader according to claim 1, wherein a load less than or equal to a value in which a maximum thrust load among from thrust loads generated on the rotor during kneading is divided by a number of the fastening bolts provided to the casing is set to be an initial axial force of the axial force measuring bolts, and the conversion factor is calibrated using axial forces measured by the axial force measuring bolts when an axial force above the initial axial force is applied to all the axial force measuring bolts.

7. A thrust load measuring device of a hermetically sealed kneader, the hermetically sealed kneader including a pair of rotors that are disposed to be adjacent to each other with a predetermined space therebetween in such a manner that axes are parallel to each other and rotate in directions different from each other, in which a bearing that supports a load applied to each rotor in a radial direction is provided at both end sides of the pair of rotors, and a load applied to each rotor in a thrust direction is supported by the bearing on one end side among from the bearings at both the end sides, the thrust load measuring device comprising:

a displacement sensor that determines a relative displacement along an axial direction between an outer race fixing component that fixes an outer race of the bearing on the one end side and an inner race fixing component that fixes an inner race of the bearing on the one end side in order to calculate a thrust load applied to the rotor by multiplying the determined relative displacement by a conversion factor;

axial force measuring bolts that can measure a load applied in the axial direction as fastening bolts for fixing the bearing on the one end side when a thrust load is applied to the rotor; and a load calculating section that calibrates the conversion factor using axial forces measured by the axial force measuring bolts and the relative displacement when the axial forces are measured such that the calibrated conversion factor is obtained by dividing the measured axial force by the relative displacement.

* * * * *